United States Patent
Shimizu

(10) Patent No.: US 6,189,020 B1
(45) Date of Patent: *Feb. 13, 2001

(54) DOCUMENT PROCESSING METHOD AND APPARATUS USING BATCH PROCESS

(75) Inventor: Haruo Shimizu, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 07/774,254

(22) Filed: Oct. 10, 1991

(30) Foreign Application Priority Data

Oct. 12, 1990 (JP) .................................. 2-272161

(51) Int. Cl.$^7$ .................................. G06F 17/21
(52) U.S. Cl. .................. 707/526; 707/529; 707/542; 345/128
(58) Field of Search .................. 345/340, 342, 345/472, 471, 467, 127–131, 143, 118–120; 707/526–529, 542; 395/148, 145, 146, 147, 167–172, 948, 342; 364/419.1, 419.17

(56) References Cited

U.S. PATENT DOCUMENTS

| | | | |
|---|---|---|---|
| 4,057,849 | * | 11/1977 | Ying et al. ............................ 345/193 |
| 4,491,933 | * | 1/1985 | Ursin et al. ........................... 395/148 |
| 4,498,147 | * | 2/1985 | Agnew et al. ...................... 364/419.1 |
| 4,523,294 | * | 6/1985 | Winn ....................................... 400/3 |
| 4,587,631 | * | 5/1986 | Nielson et al. ....................... 395/146 |
| 4,692,042 | * | 9/1987 | Cuff et al. ............................... 400/94 |
| 4,896,289 | * | 1/1990 | Svinicki et al. ...................... 364/900 |
| 4,898,483 | * | 2/1990 | Iizuka ..................................... 400/61 |
| 4,962,475 | * | 10/1990 | Hernandez et al. .................. 395/146 |
| 5,001,697 | * | 3/1991 | Torres .............................. 395/354 X |
| 5,133,051 | * | 7/1992 | Handley ................................ 395/148 |
| 5,339,390 | * | 8/1994 | Robertson et al. ................... 345/342 |
| 5,562,350 | * | 10/1996 | Sakurai ............................ 707/542 X |

FOREIGN PATENT DOCUMENTS

| | | |
|---|---|---|
| 57-209537 | 12/1982 | (JP) . |
| 60-108883 | 6/1985 | (JP) . |
| 61-141029 | 6/1986 | (JP) . |
| 63-187331 | 8/1988 | (JP) . |

OTHER PUBLICATIONS

*Microsoft Word (version 5.0)*; 1989; pp. 206–209.*
Chamberlin, et al., "JANUS: An interactive document formatter based on declarative tags", *IBM Systems Journal*, vol. 21, No. 3, pp. 250–271, 1982.
Appelt, "The Integration of $T_EX$ into an Interactive Text Processing Environment", *Informationstechnik IT*, vol. 28, No. 6, pp. 342–347, 1986.
Irumi Kimura, "Text–Formatting Languages", vol. 22, No. 6, Jun. 1981, pp. 559–564.
Donald E. Knuth, "The TEXbook", 1984, pp. v–ix.

* cited by examiner

*Primary Examiner*—Joseph H. Feild
(74) *Attorney, Agent, or Firm*—Fitzpatrick, Cella, Harper & Scinto

(57) ABSTRACT

A document processing apparatus for inputting, type-setting and displaying the document information includes a type-setting section for type-setting a document information in a batch process, by receiving it in a unit of page, and a display section for displaying the document information type-set by said type-setting section, by receiving it in a unit of a page.

9 Claims, 14 Drawing Sheets

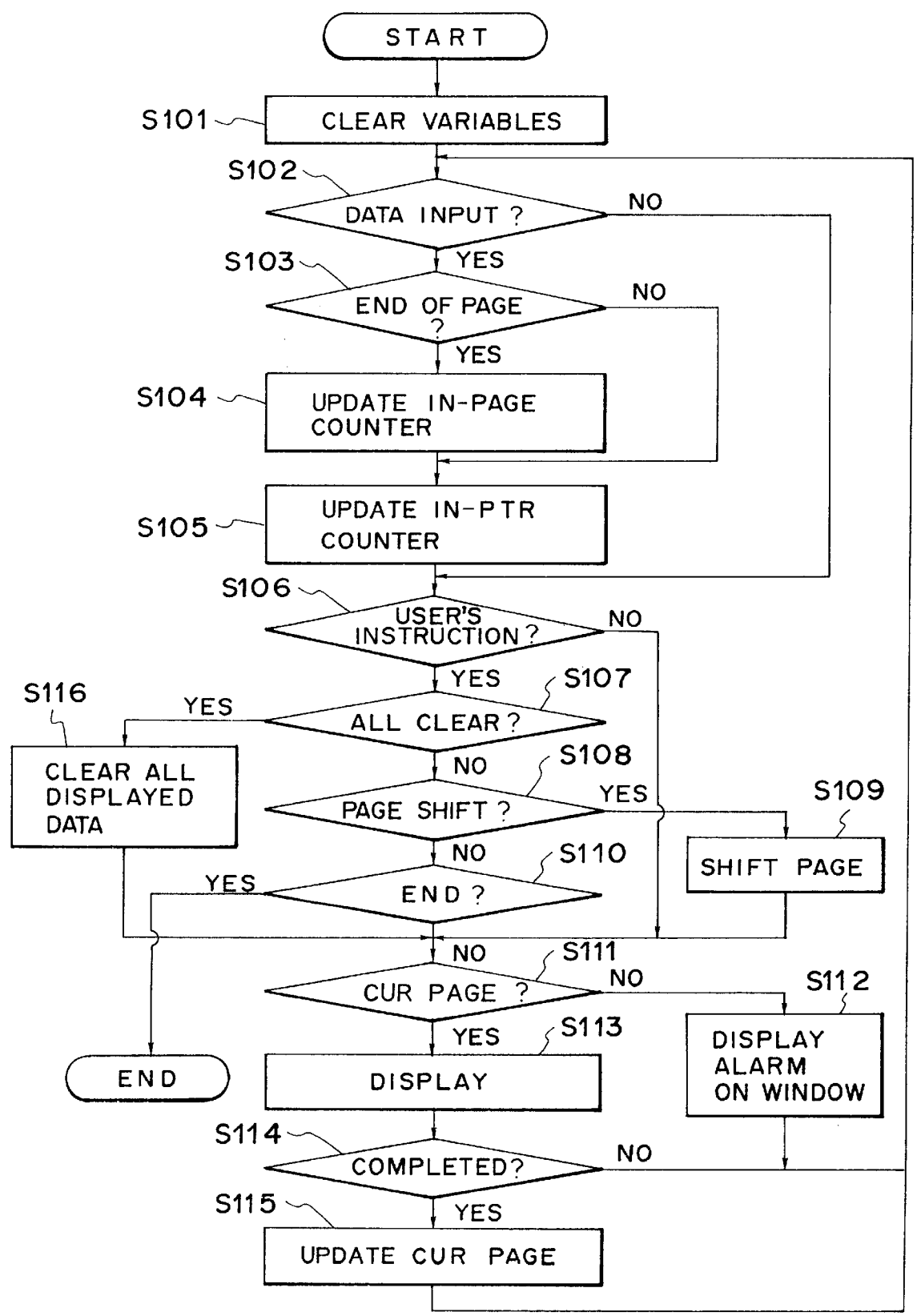

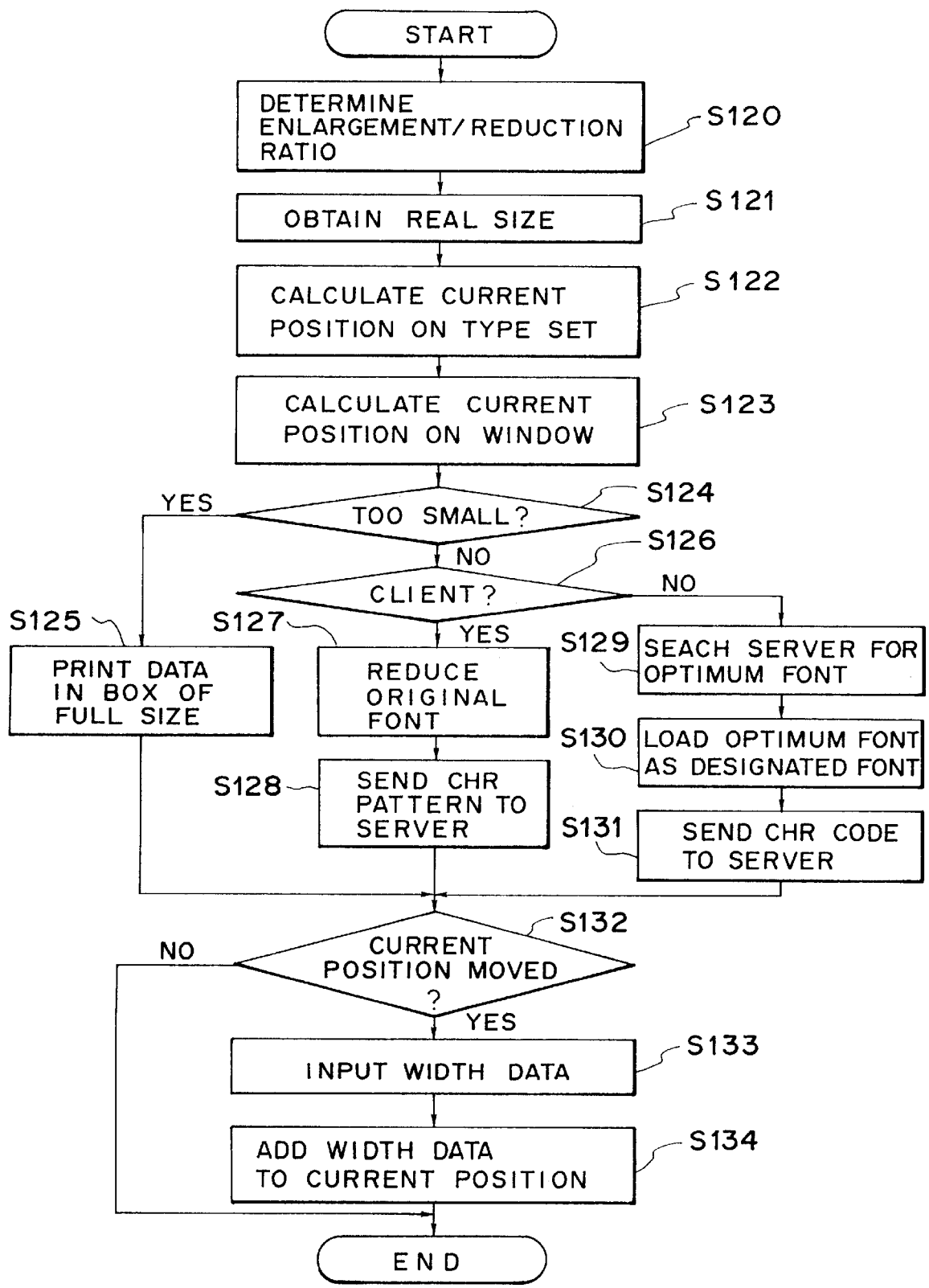

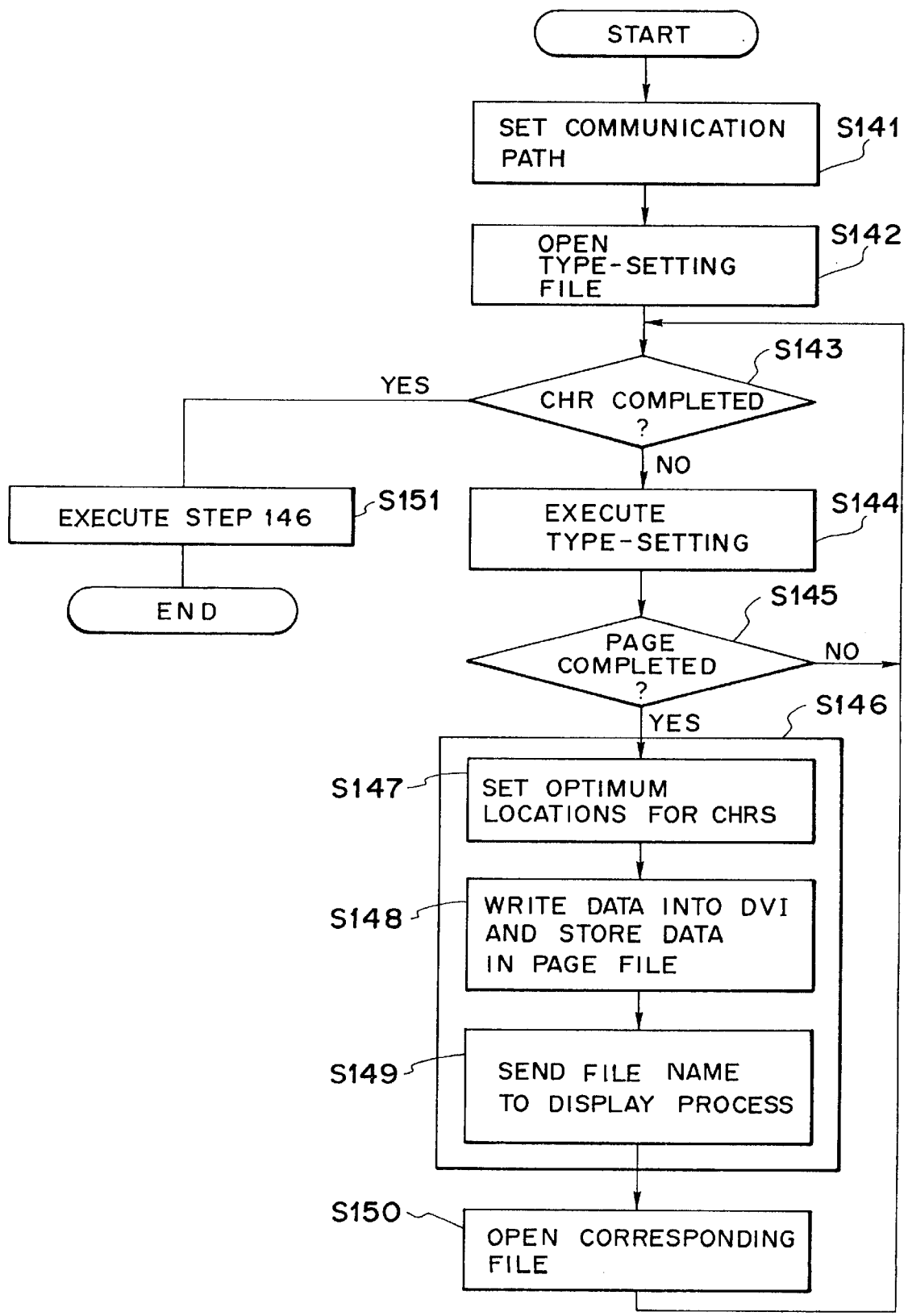
F I G. 13A

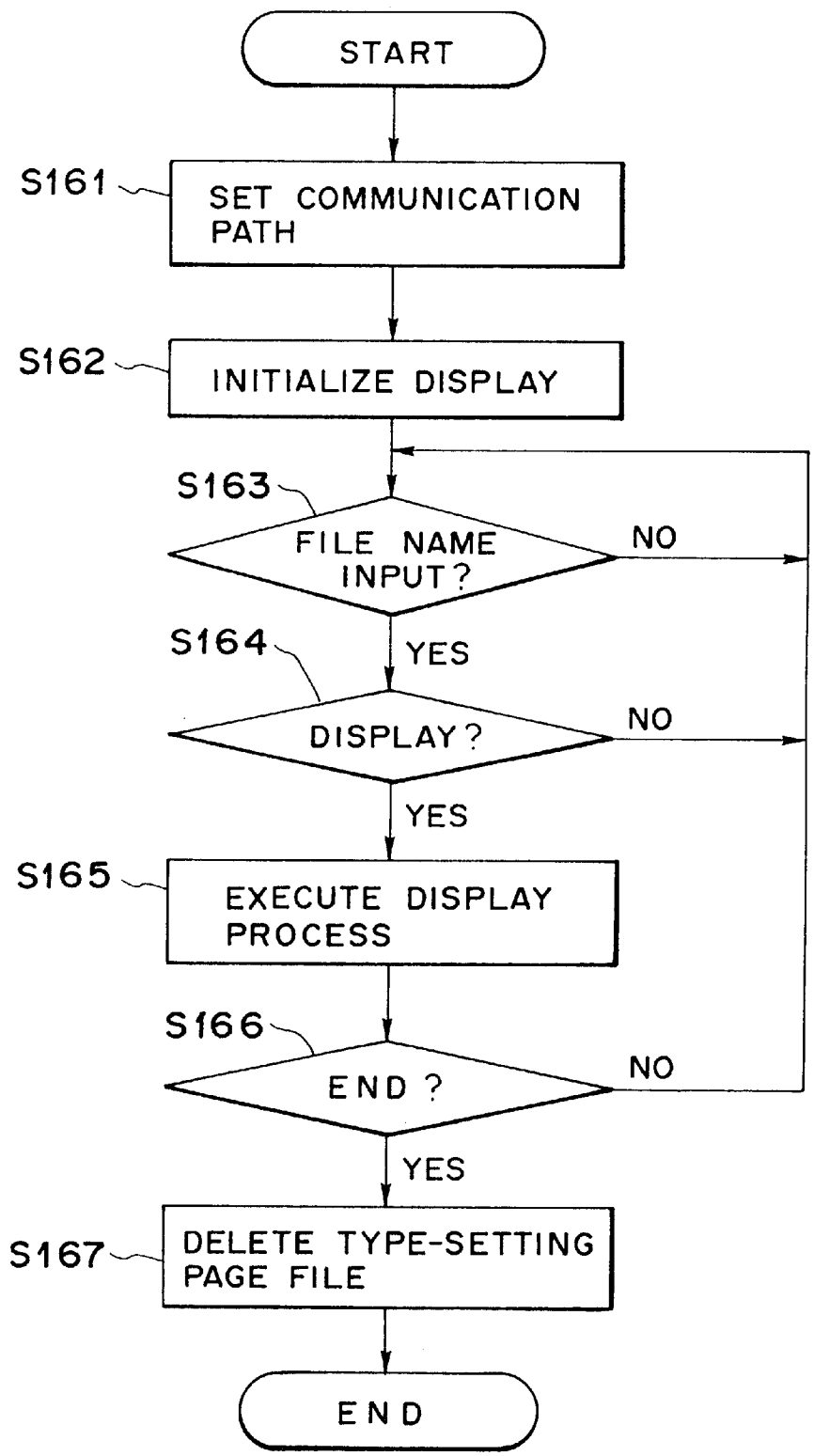

DOCUMENT PROCESSING METHOD AND APPARATUS USING BATCH PROCESS

BACKGROUND OF THE INVENTION

1. Field of the Invention

The present invention relates to a document processing apparatus for inputting, type-setting, and displaying the document information.

2. Related Background Art

In the DPI field, there are two forms of type-setting for calculating the optimum location of character within a page. One of them is a WYSIWYG (What You See Is What You Get) system, to which widely used word processors correspond. This system is such a system that the document creator inputs characters in the corresponding character sizes to their corresponding locations, while seeing the final print format on a screen.

This system has the following features.

[Merits]
① Document can be created as desired because the user can input characters while seeing the final screen.
② Excellent user interface.
③ Easy creation of short document.

[Drawbacks]
① Difficulty in systematic handling of a large quantity of documents.
② Batch processing is needed for making the content or index.
③ Difficulty in reusing documents in other systems.
④ Dedicated apparatus is needed.

The other form is a batch system, to which a TEX created by Dr. Kunth in Stanford University, or a roff system developed by the AT/T correspond (see a book by Izumi Kimura: "Document fairing language" (also entitled "Text-Formatting Languages), information processing, p.559 to p.564, June, 1981).

This system is operated in such a way that a source file 51 including instructions for type-setting the document is created with a text editor 52, an intermediate file 53 is created by compiling it for the type-setting 52, and its result is displayed 54 on the screen or printed 55 on the printer, as shown in FIG. 2.

This system has the following features.

[Merits]
① Easy systematic handling of a large quantity of documents.
② A function for making the content or index can be easily incorporated.
③ The source file of documents can be easily reused in other systems.
④ The document can be created with an ordinary text terminal.

[Drawbacks]
① Difficulty for a nonprofessional due to its form of programming the document.
② Processed result must be compiled to display it.
③ For creation of a shorter document, it is simpler to use the WYSIWYG.

As seen from the above comparison, there are respective merits in the document processing system such as the WYSIWYG or batch-type, but it is conceived that the merits of the batch type system, such as a batch processing function for the content or index, or creation of the document in the same page style throughout all pages by introducing a style sheet, are adopted into the WYSIWYG type system. On the other hand, in the batch type system, instead of forcing the user to program the document, a structure editor is provided, so that the user is prompted for the input command with the icon, thereby eliminating the necessity of being thoroughly acquainted with the type-setting commands.

In this way, the recent document type-setting processing exhibits hybrid aspects of the WYSIWYG and batch-type.

Thus, in the document processing system of batch-type, the drawbacks of this system have been significantly overcome, but unresolved problems still remain. In conventional batch systems, the final document image was visualized through a process of displaying or printing after the compilation of a source file, taking a very long turnaround time, so that there was a large dissatisfaction for the user. Also, for the display of text images, their physical images were only shown, but there was no function of clarifying the interconnection of the information. Furthermore, in most cases, the number of display images was fixed, such as one or two, so that it was impossible to see the page layout of more images simultaneously.

SUMMARY OF THE INVENTION

It is an object of the present invention to provide a document processing method in which the transfer of data between the type-setting and display processings is allowed so that type-set results can be rapidly displayed.

It is an another object of the present invention to provide a document processing apparatus for inputting, type-setting and displaying the document information, comprising type-setting means for type-setting a document information, and display means for displaying the document information type-set by said type-setting means, by receiving said document information in a unit of page.

It is another object of the present invention to provide a document processing method and apparatus which is capable of receiving and displaying a document information type-set by type-setting means for type-setting the document information in a unit of page in sequence.

BRIEF DESCRIPTION OF THE DRAWINGS

FIGS. 10A and 10B are flowcharts showing a basic algorithm of this example, in which FIG. 10A is a flowchart showing a type-setting processing algorithm which is changed from the processing as shown in FIG. 8, and FIG. 10B is a flowchart showing a display processing algorithm which is changed from the processing as shown in FIG. 8.

FIG. 11 is a flowchart showing a detail algorithm of a core portion in the display program.

FIG. 12 is a flowchart showing the details for representing characters.

FIGS. 13A and 13B are flowcharts showing a basic algorithm of another example, in which FIG. 13A is a flowchart showing another example of type-setting algorithm, and FIG. 13B is a flowchart showing another example of display algorithm.

DETAILED DESCRIPTION OF THE EMBODIMENTS

The preferred examples of the present invention will be described below in detail with reference to the appended drawings.

<Description of document processing system (FIG. 1)>

Figure 1:
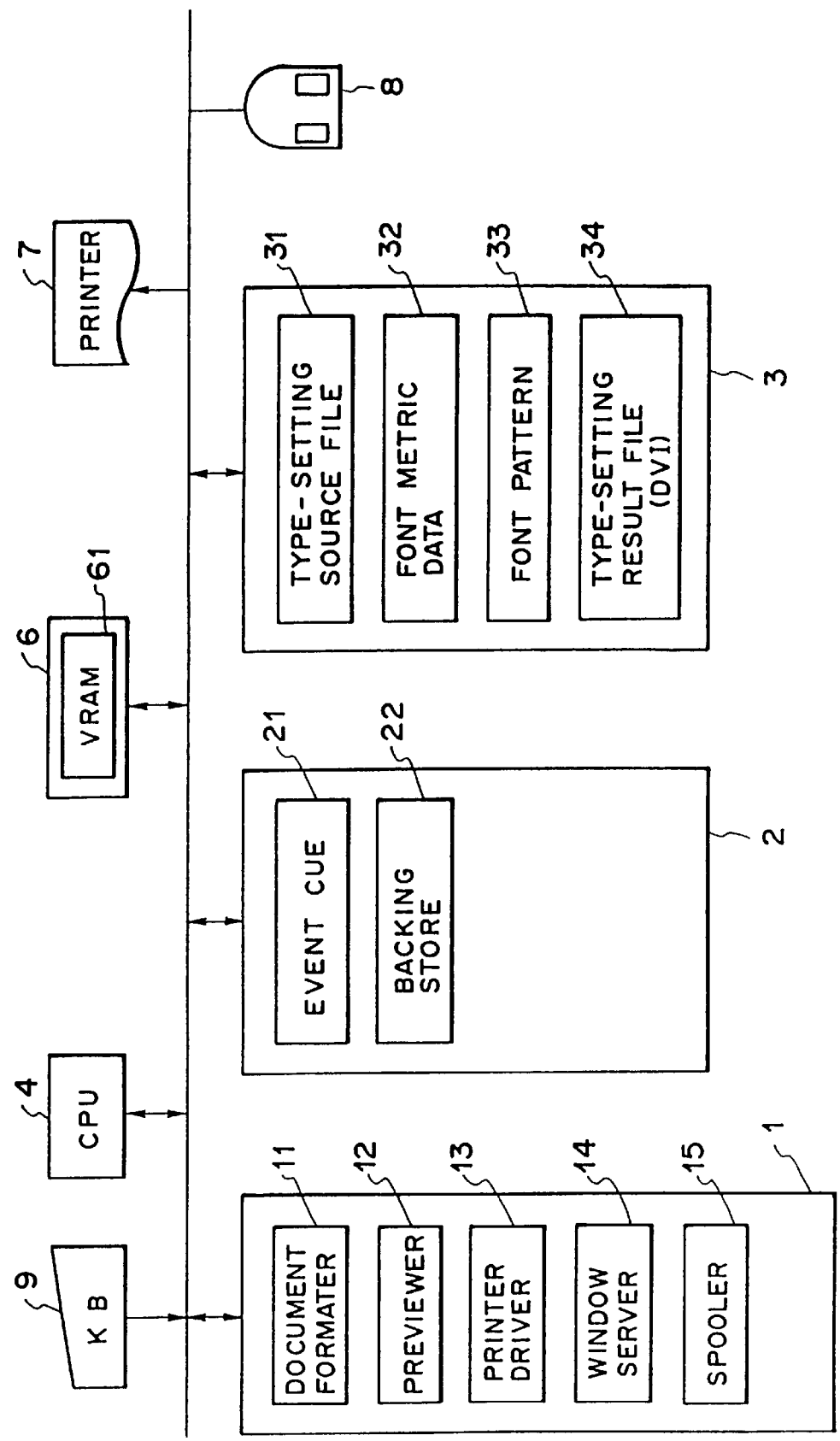
FIG. 1 is a block diagram showing a basic configuration of a document processing system in this example.
Figure 2:
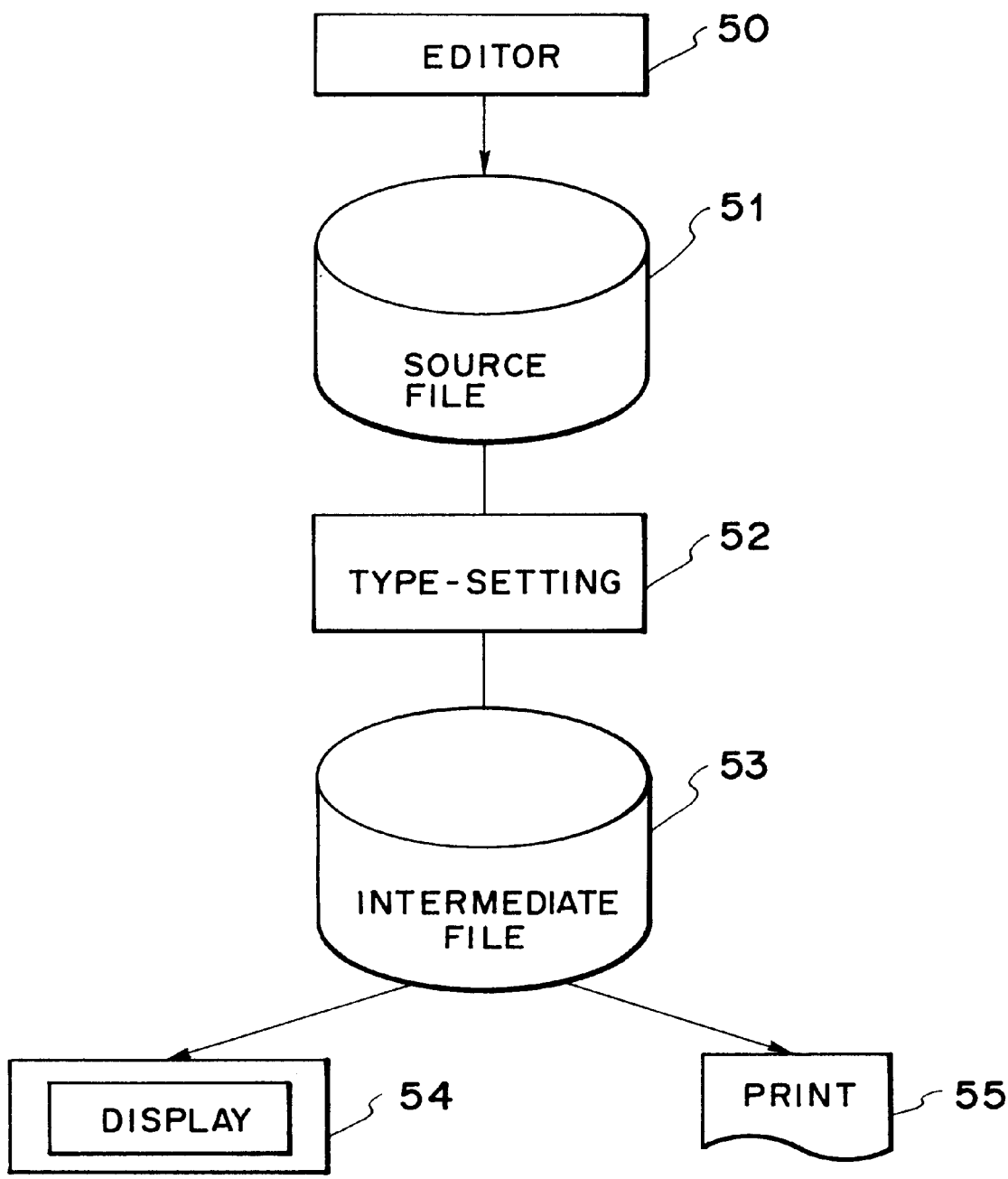
FIG. 2 is a view showing a basic configuration of a conventional batch system.

FIG. 1 is a block diagram showing the configuration of a document processing system in the first example according to the present invention.

In the figure, 1 is a memory portion for storing the procedures of this system, 2 is a memory portion for storing the information necessary for the processings of this system, 3 is an external storage device for storing input and output data Of this system and 4 is a CPU for making the processing in accordance with a procedure stored in the memory portion 1. 6 is a multi-window display portion for displaying the processed results of this system, 7 is a printer for printing the processed results of this system, and 8 is a mouse for inputting a command from the user. 9 is a keyboard (KB) for use in creating a program or entering a command into this system.

In the memory portion 1, 11 is a document formatter which is a type-setting program for outputting a type-setting result file (DVI) 34 with the input of a source file from a type-setting source file 31 and a font metric data 32. 12 is a previewer which is a program for displaying the type-setting results onto the multi-window display portion 6 with the input of the DVI file 34 created by the document formatter 11, a font pattern 33 and the font metric data 32. 13 is a printer driver which is a print program for outputting the type-setting results to the printer 7. 14 is a window server which is a program for operating the multi-window display portion 6. 15 is a spooler which is a spooler program for printing data in accordance with a starting sequence when a print command is issued.

In the storage device 3, 31 is the type-setting source file which contains the instructions and document information for type-setting. 32 is the font metric data which is a file containing the metric information of characters (character height, character depth, character width) necessary for type-setting the character. 33 is the font pattern which stores the character dot patterns necessary for displaying or printing the document data. 34 is the type-setting result file which is a DVI (DeVice In dependent) file for storing the type-setting results.

Next, in the memory portion 2, 21 is an event cue for cuing a request from the user which is input with the mouse 8 or keyboard 9. 22 is a batch memory useful for displaying data on the window display portion 6 in such a manner as to once draw the data on this backing store memory 22 and then map it onto a VRAM 61, instead of accessing directly to the VRAM 61.

First, a type-setting function will be described.

This program is based on a TEX created by D. Kunth in Stanford University (see Donald E. Kunth, "The TEXbook", Addison-Wesley, 1984).

The type-setting function is to fair a page using two basic concepts. One of them is a concept of box, such as a character font, which does not change in height and width, irrespective of the location within the page. The second one is a concept of glue, which is a box-to-box space amount expandable or reducible to adjust the end of line.

Using these two concepts, the optimum locations of characters in the line direction are determined in a combination of boxes and glues.

Next, in order to appropriately fit the character trains, which have been optimally located in the line direction, within one page, the balances between character trains are adjusted.

Here, an algorithm for optimum locations of characters in the line direction will be first described, using the box and glue as above described. For example, the following two cases of adjusting the end of line will be described.

It is fine today, isn't it? (22)

This is just an example. (20)

Here, for simplicity, assume that the character widths as box are all at a fixed pitch, there is no blank or blank space between characters within a word, and further the following values are provided.

Character size=10 pt

Line width=250 pt

Glue=Fixed width (10 pt)

Expandable amount (20 pt)

Reducible amount (5 pt)

However, in practice, the metric information of character is input from the font metric data 32 for each font.

In doing so, the natural length of a first line is

10(pt)×22(characters)+10(pt)×5(blanks)=270(pt), and the natural length of a next line is 10(pt)×20(characters)+10(pt)×4(blanks)=240(pt).

As the full line width is 250 pt, it is necessary to reduce the glue for the first line, and expand it for the latter. Their amounts are $$(270-250)/5=4 \text{ pt}$$

$$(250-240)/4=2.5 \text{ pt}$$

respectively.

Figure 3:
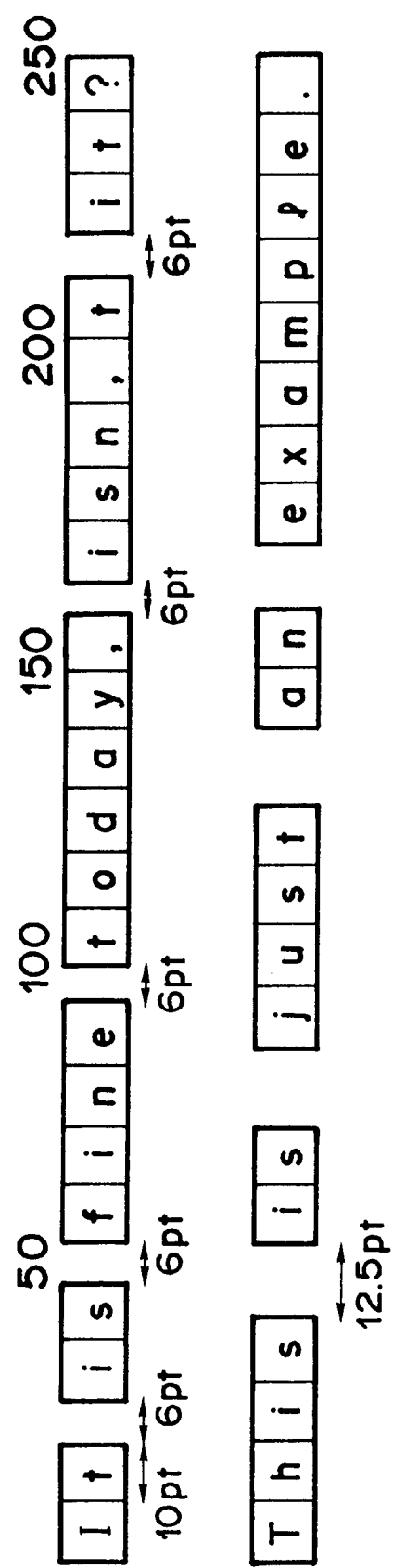
FIG. 3 is a view showing an example of the line end adjustment for character trains.

The results thus obtained are shown in FIG. 3, in which the word-to-word space of text at the first line is 6 pt with a reduction of 4 pt, while the space of text at the second line is 12.5 pt with an enlargement of 2.5 pt.

Figure 4:
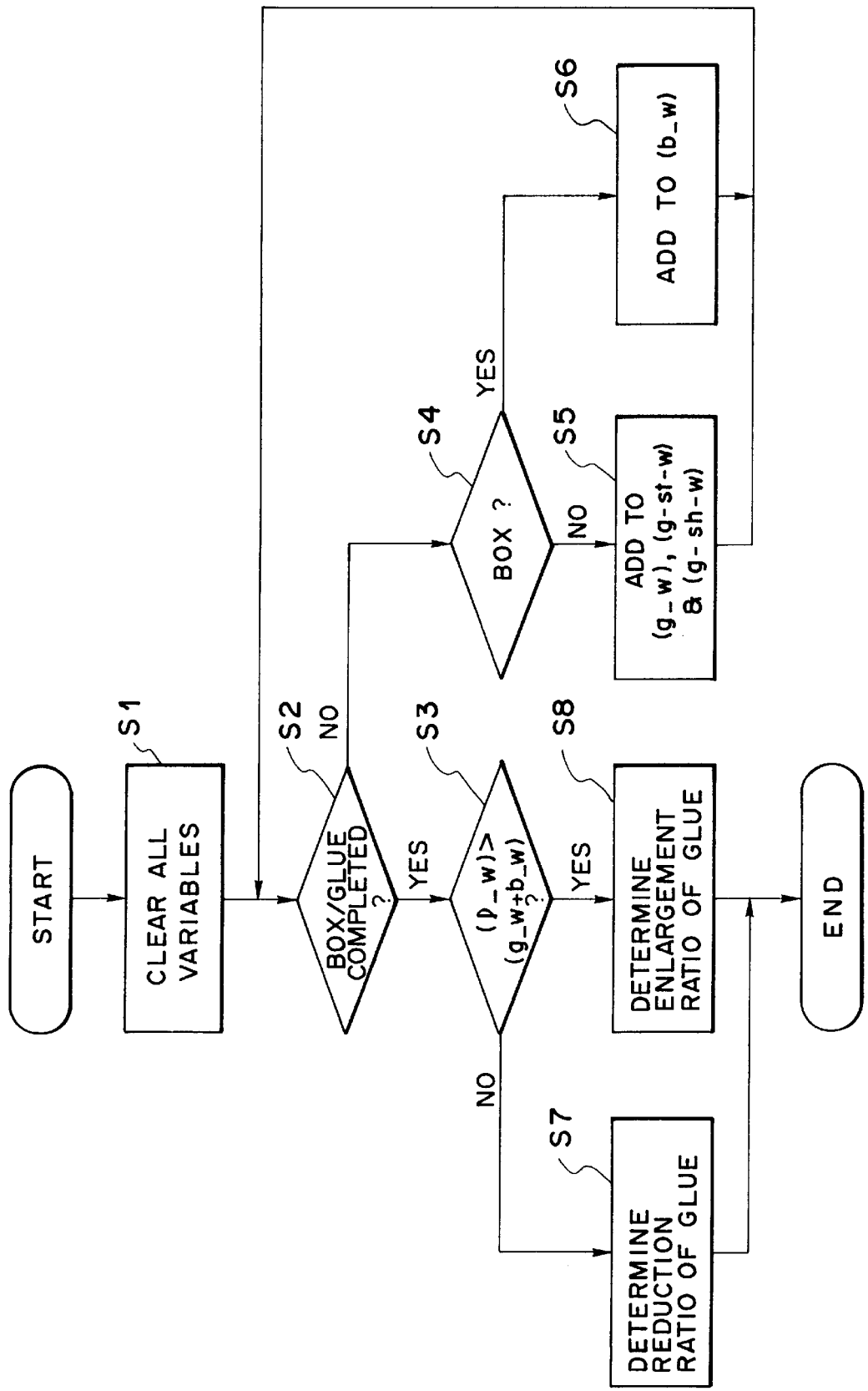
FIG. 4 is a flowchart showing an algorithm for optimum locations for characters in a horizontal direction of line.

Here, an algorithm for optimum locations in the line direction will be briefly described below with reference to a flowchart as shown in FIG. 4, starting from the variables.

x is a character position in the horizontal direction, (b_w) is a total value of box widths within a line, (g_w) is a total value of natural glue widths within the line, (g_st_w) is a total value of glue enlargement amounts within the line, (g_sh_w) is a total value of glue reduction amounts within the line, and (l_w) is a line width of type-setting.

First, at step S1, the variables (x, b_w, g_w, g_st, g_sh_w, l_w) for use in determining the optimum locations in the horizontal direction of one line are cleared. Next, proceeding to step S2, the boxes or glues which are elements constituting the line are sequentially read, and then the procedure proceeds to step S3 if the elements have been completed, or to step S4 if not.

At step S4, a determination is made whether or not the input element is box, and if it is box, the procedure proceeds to step S6, where the width of box is added to (b_w) (for character, the character width is fetched from the font metric data 32 of FIG. 1). If it is glue, the procedure proceeds to step S5, where the glue width, enlargement amount and reduction amount are added to (g_w), (g_st_w) and (g_sh_w), respectively. In this way, if one line of information has been input, the procedure proceeds to step S3, it is checked whether this line has the glue amount enlarged or reduced, or unchanged. This is performed by the comparison between (l_w) and (g_w+b_w), in which if the former is larger, the enlargement of glue (step S8) is made, or otherwise, the reduction of glue (step S7) is made.

At this time, the enlargement ratio e of glue is obtained by the following expression $$e=\{(l\_w)-(g\_w+b\_w)\}/(g\_w)$$

and the reduction ratio r is obtained by the expression $$r=\{(g\_w+b\_w)-(l\_w)\}/(g\_w)$$

It is noted here that if (l_w−(g_w+h_w))>g_st_w, the enlargement exceeding an expandable glue amount is made, so that the box-to-box interval may be too widened to produce optimum locations. On the other hand, the reduction is so serious that previous and next boxes may overlap, unlike the enlargement. To cope with this situation, the reduction ratio of glue must be calculated in a line break processing so that it may not exceed 1.0. Thus, the enlargement and reduction ratios of glue for each line are kept to be used in later calculation of optimum locations of boxes.

However, actually, things are not simple as above described, but there is a problem (line break) where the line should be broken for the character trains input from the user to adjust the end of line.

The line break problem can be solved with a variety of methods, of which the simplest method in determining the line break position for each line will be described. Besides this, there is a method of calculating the line break with the dynamic programming, which allows a more excellent result to be obtained.

The line break will basically take place only at the glue position, namely, there occurs no line break within a word made up of boxes without glue such as an English word (except for hyphenation). On the contrary, when the glue is contained between characters (boxes) such as Japanese, the line break may take place at any interval between characters (except for the case of prohibiting the line head and line end).

Figure 5:
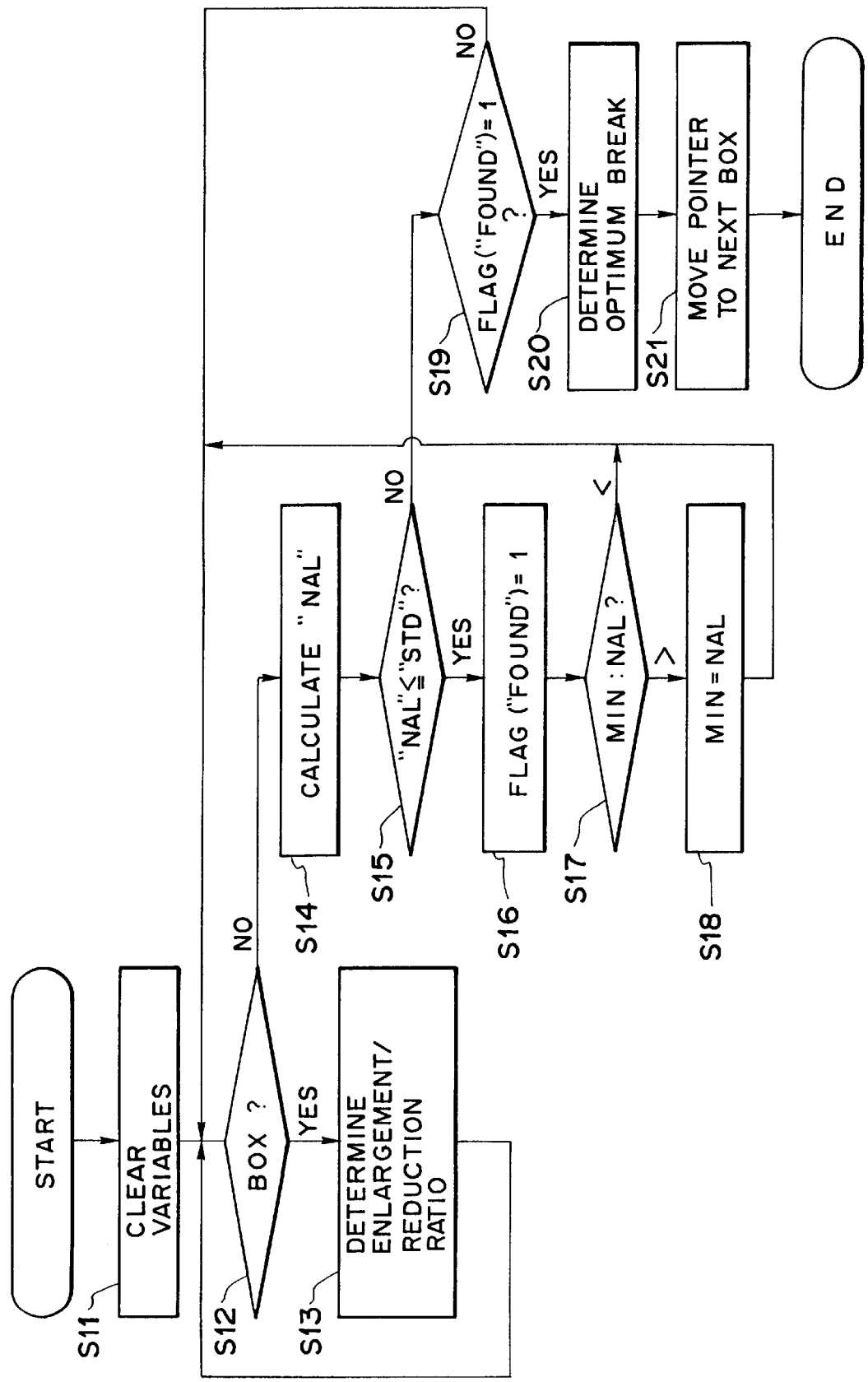
FIG. 5 is a flowchart for explaining an algorithm for line break.

Referring now to FIG. 5, an algorithm for calculating the optimum line break will be introduced in the following.

First, at step S11, various variables for use with this algorithm are cleared, and then the constituents of text are read by using a pointer (ptr), and it is judged whether the current element is box or glue. For the box, proceeding to step S13, the enlargement/reduction ratio of glue is calculated with the same method as shown in FIG. 4.

On the other hand, if the glue is judged at step S12, the procedure proceeds to step S14, where a value for evaluating the line break is calculated. Here, as one example, the following is set.

$$Nal=(\text{ratio})^2+(\text{penalty})^2$$

Here, ratio indicates an enlargement/reduction ratio, and penalty indicates a penalty value to be taken if the break takes place. For example, in Japanese, if the punctuation is located behind a current glue position, the penalty value is increased because of prohibitive processing, so that the line break may not easily take place before the punctuation. A variety of functions can be conceived as this evaluation expression, an example of which will be shown later.

Next, at step S15, it is judged whether or not this evaluation value (Nal) lies within standard (std) of the line break, and if it is within the standards, the procedure proceeds to step S16, where 1 is set to a flag (found), indicating that at least one optimum line break position has been detected. And at step S17, the evaluation value and the minimum value min of the previous evaluations are compared, and if Nal is smaller, the procedure proceeds to step S18, where the value of Nal is set to min, so that a best_ptr indicating the optimum break position is set to point to a current glue position.

On the other hand, at step S15, if the evaluation result (Nal) is not within the standards, the procedure proceeds to step S19, where it is judged whether or not the optimum break position might take place before. If so, the procedure proceeds to step S20, where the optimum break position is determined at the glue position pointed to by the best_ptr, and to prepare for the next line, the ptr position to be scanned is moved to a box position taking place next to the glue of min (step S21).

In this way, the calculation for determining the line break and locations in the horizontal direction within the line is performed.

The next procedure is a calculation for disposing the boxes for each line within the page in the vertical direction, but it can be performed in the same procedure as the previous calculation of locations in the horizontal direction. As the calculation can be performed by substituting the character box and character-to-character glue with the line height and line-to-line glue, the explanation will be omitted.

Figure 6:
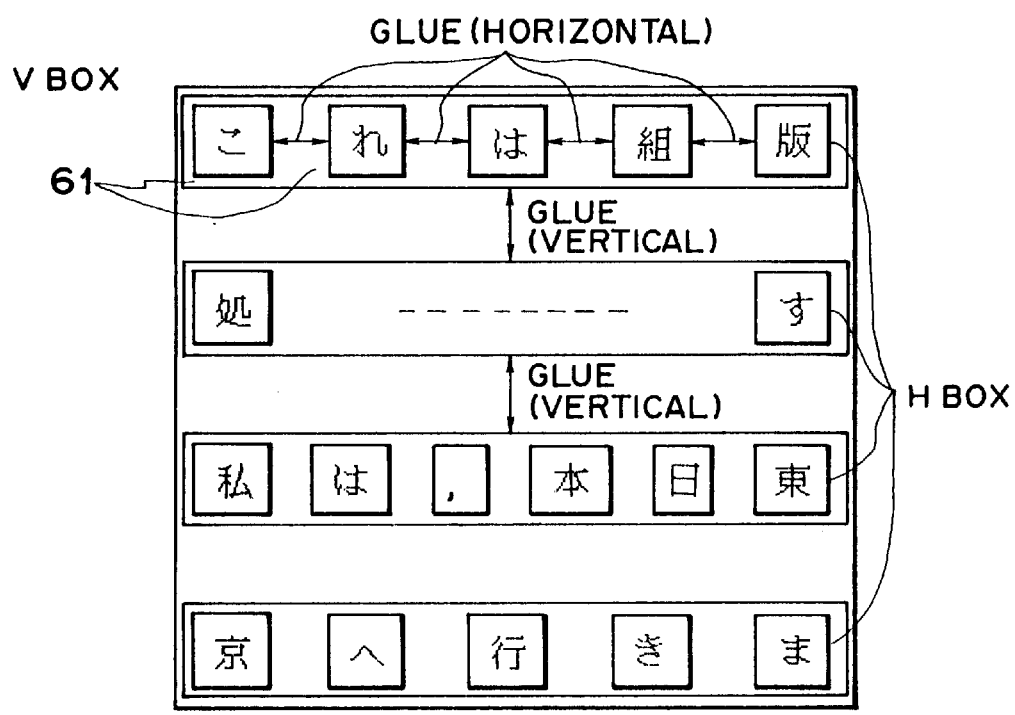
FIG. 6 is a view for explaining hbox and vbox location trains.

The final state where all boxes are disposed in the horizontal and vertical directions is shown in FIG. 6. The reference position of box is indicated with • (61). There are two kinds of boxes here: hbox for aligning the base line of box (reference position) in the horizontal direction, and vbox for aligning the reference position in the vertical direction.

Finally, as shown in FIG. 6, the following box location processing is performed in accordance with vbox and hbox, starting from vbox at the most-outside frame and recursively.

In vbox, x coordinates at the reference position of boxes to be contained are the same, while y coordinates will change. If data to be contained is box, the y coordinate is the addition of a box height to the current reference position. On the contrary, the glue, the reference position can be updated by adding the amount of spaces corresponding to an original glue width multiplied by the enlargement/reduction ratio to the current reference position.

Figure 7:
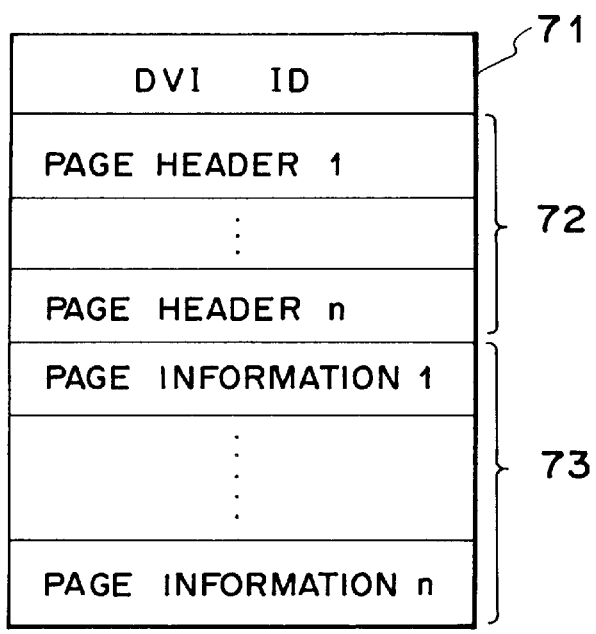
FIG. 7 is a view showing the data format of a DVI file for storing the results of type-setting processing.

Likewise, for hbox, the y coordinate at the reference position is fixed, while the x coordinate can be obtained by adding a box width to the current reference position. Also, the glue can be obtained by adding the amount of spaces corresponding to an original glue width multiplied by the enlargement/reduction ratio to the current reference position. Such type-setting results are stored in the type-setting result file (DVI file) 34 as shown in FIG. 1. The designation of DVI is derived from the fact that the type-setting results must be held in the form not depending on the resolution or font for a printer or display portion for outputting the type-setting results, so that the same results are assured in any machine. An example of the intermediate file is shown in FIG. 7.

71 is an identifier for identifying the DVI file, and 72 is a page header including the information of each type-set page, e.g., the font name or size for the page, and a pointer to the type-setting information of actual page, in which there are headers corresponding to the number of pages. 73 is a page information section, including the actual type-setting information, in which the following information is basically stored.

Font changing (type phase+size) instruction
Character code
Movement amount in the horizontal direction
Movement amount in the vertical direction
Rectangle drawing (displayed in specified width and height at the current position) instruction The basic unit in calculating the type-setting position is $2^{-16}$ pt (pt is equal to 1/72 inch), for example, which is a unit of allowing the calculation with substantially no errors even if the calculation may be made in a unit of integer. Thus, the parameters of movement amount in the horizontal and vertical directions as above described are set in a unit of $2^{-16}$ pt.

Figure 8:
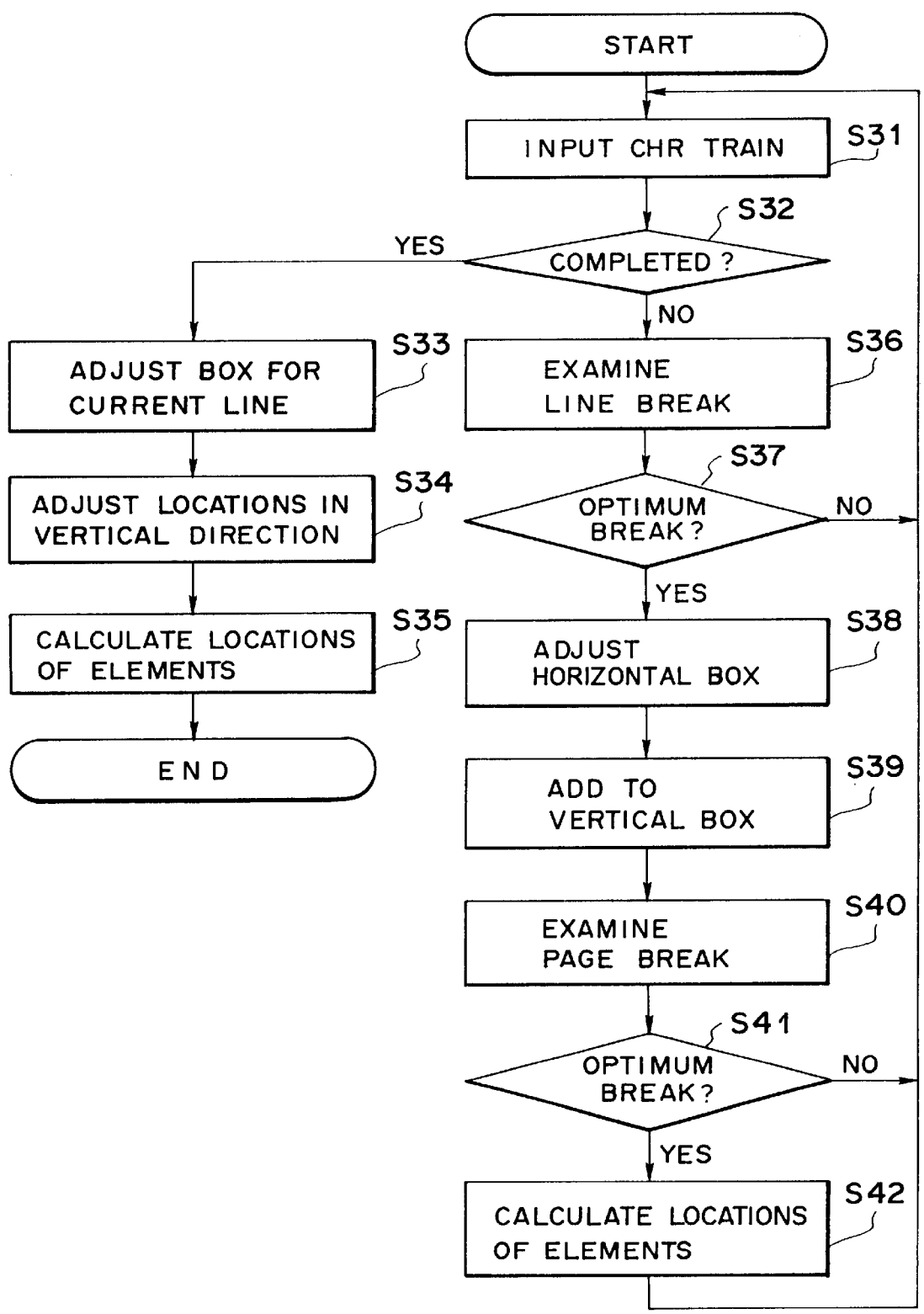
FIG. 8 is a flowchart showing the overview of a type-setting processing which is a basic part in this example.

Finally, all the type-setting algorithms as previously described are shown as a flowchart in FIG. 8.

Next, a display program (previewer) for type-setting results which will serve as a second primary constituent of this example will be described. The previewer 12 is characterized in that the type-setting results can be confirmed on the screen at high speed and cheaply, before the print-out of the type-setting results is made, owing to the appearance of the multi-font typical of the recent X window and a window system having the figure drawing feature.

Figure 9:
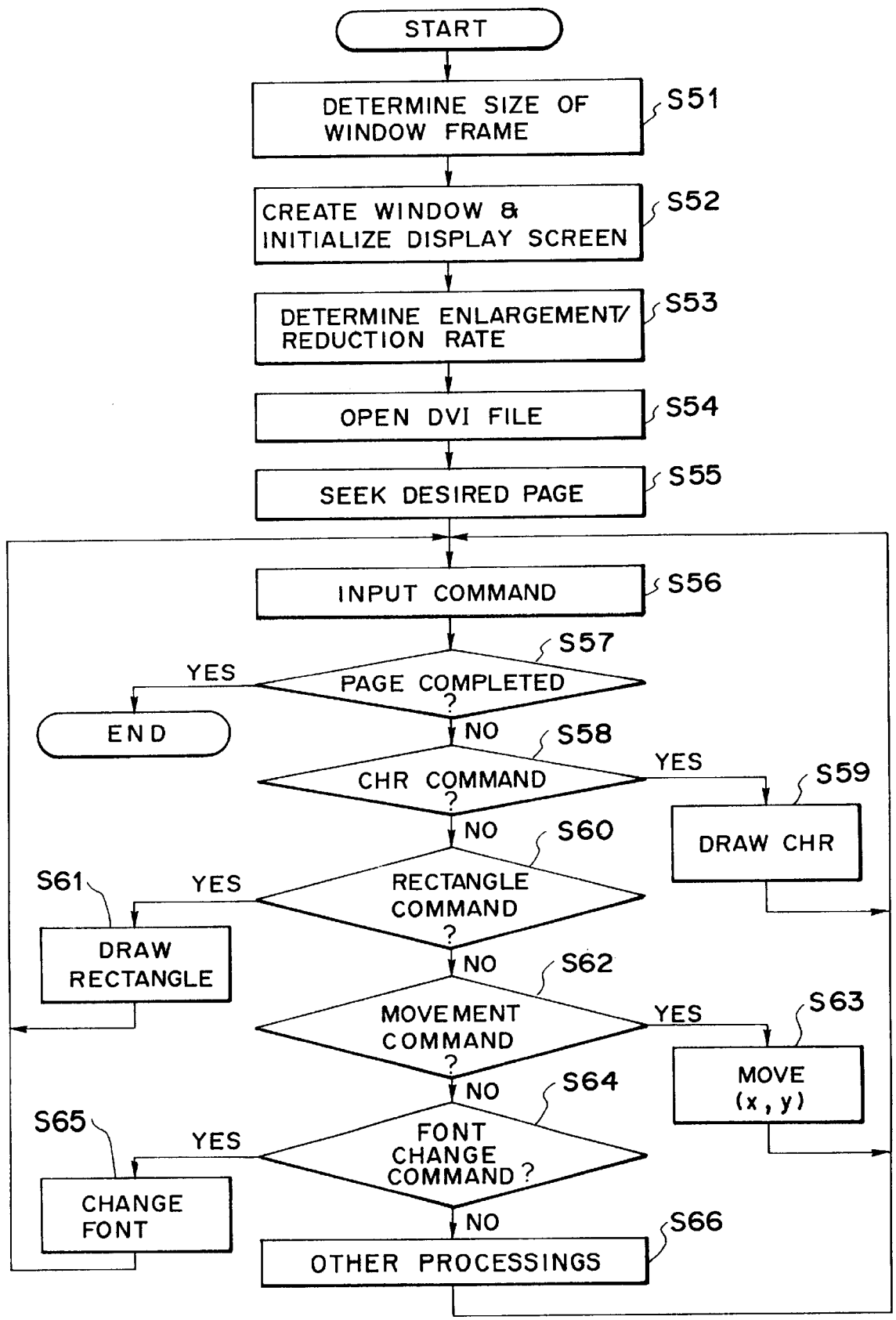
FIG. 9 is a flowchart showing the overview of a display processing which is a basic part in this example.

This program can be more easily implemented than the previous type-setting processsing, and the outline of algorithm will be described below with reference to a flowchart of FIG. 9.

First, at step S51, the size of window frame for displaying the type-setting results is determined. Normally, this size should be set so as to be the maximum size of display. Next, at step S52, the window area for actual display is reserved and the display screen is initialized. In this case, as the resolution is different between the actual print image and the CRT display screen, the character font is required to reduce for the printer. This reduction ratio is determined at step S53, wherein it becomes a ratio of the dot size of display screen in the vertical or horizontal direction to that of original document in the vertical or horizontal direction at the resolution with which used font was created.

After these preparations, the procedure proceeds to step S54, where the DVI file to be displayed, which was created with the document formatter 11, is opened to seek for the page information to be displayed within the file by referring to the page header 71 as shown in FIG. 7 (step S55).

Next, at step S56, the type-setting information 73 within the page is scanned for each command, and at step S57, corresponding processing routines are repeatedly executed until the page is completed (steps S58 to S66).

These processing routines are largely classified into the following five groups.

(1) Character command (steps S58, S59)

The character command has a character code as the parameter, serving to display the character code specified by the current font type and size at the current position.

This font is one as specified when the font is changed, in which the pointer to a procedure involving the method of access to one-byte (English) or two-byte (Japanese) font has been obtained when changed. As a result, at step S59, characters are drawn on the window by giving the character code and current position information to a function pointed to by the pointer. However, there are different methods of displaying characters depending on the format of the window display 6. For example, in a server/client model for the X window, the service method is differed depending on whether the display font exists on the client side or the server side. A large different point is that when the font exists on the client side, its font is once reduced and converted into an optimal font size, and the font image is sent to a server.

On the contrary, when the font exists on the server, the most optimum font is selected among the fonts within the server, and the code is only sent from the client, because the enlargement or reduction of font can not easily made from the client side.

(2) Rectangle command (steps S60, S61)

This rectangle command constitutes an underline, overline, enclosing frame, ruled line, etc., having the information of a width and a height from the current position as the command parameter to draw the rectangle. Since any window system has rectangle drawing commands, the current position, width and height are converted with the multiplication of a reduction ratio into their values on the window (note that the width and height need one dot at minimum), and the results are indicated to the window display 6.

(3) Position movement command (steps S62, S63)

The current position (x, y) can be kept by adding the amounts corresponding to the vertical and horizontal movements to the variables h, v which hold internally the (x, y) coordinates at the current position.

(4) Font change (steps S64, S65)

If an instruction for changing the print font (including the type phase and size information) is input, the pointer to a font access function within the client is changed in a system where the font exists on the client side of X window, for example. On the contrary, when the font exists on the server side, an instruction for changing it into an optical font is sent from the client to the server, within which a processing associated with the font change is internally performed.

(5) Other processings (step S66)

In addition to the above four processings, it is necessary to process the commands as listed below.

Special commands (Non-generalized special commands)
Push and pop instructions for the current position By using the type-setting feature and type-setting result previewer (display) feature as above described, this example further offers an interactive type-setting environment with the intercommunication between both programs. As means for intercommunication between programs, there is provided a "socket" or "pipe" system call, or a shared memory feature between programs, in the Unix (registered trademark of AT/T).

As the method of communicating data between the type-setting program and the display program, two methods can be conceived as described below.

(1) Direct transfer of type-setting results

This is a method of transferring the type-setting results of a type-setting program through a communication path created with "socket" or "pipe" to the display program in sequence. As a result, the display program can display sent data if there is any data to be displayed, while buffering them into the file.

(2) Creation of temporary page information file

If a file is created for each page by buffering type-setting results with the type-setting program for each page, its file name is notified to the display program. Thereby, the display program opens its file to display the contents of page.

Here, an interactive type-setting display using the former method will be described. Note that in this example, the type-setting program 11 as previously described (FIG. 8) is used without significant changes.

Figure 10A:
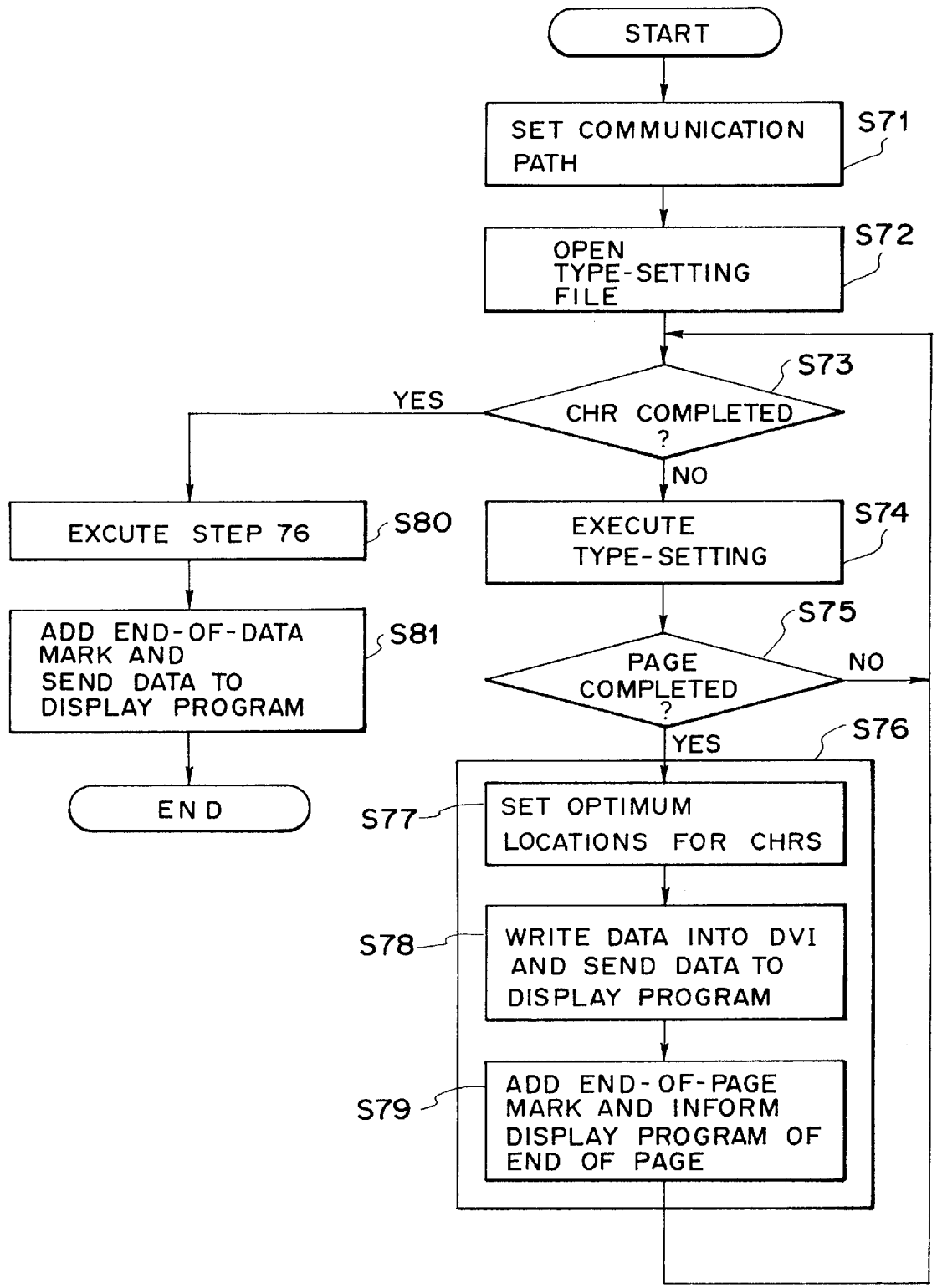

First, an algorithm will be described with reference to a flowchart as shown in FIG. 10A. As the type-setting program is a sender of type-setting results to the display program (previewer), the communication path for data communication with the display program 12 is set (step S71) by issuing a socket+bind+connect system call provided on the Unix, for example. And at step S72 to S75, the page is caused to break at the optimum location as in the previous type-setting algorithm.

Next, at step S77, each element (character box or glue) within the page is allocated to the optimum location, and at step S78, type-setting result data are not only written into the DVI file, but also sent through the communication path set at step S71 to the display program 12. At step S79, an end-of-page mark is added if the page is completed, and the end of page is informed to the display program.

At the end of document, the procedure proceeds to step S80, where the same processings as for the end of page at step S76 are performed, and finally, at step S81, an end-of-data mark is added and data is sent to the display program.

Next, the processing outline of the display program 12 will be described with reference to FIG. 10B.

This program 12 firstly sets the communication path with the type-setting program at step S91, in order to receive and display the type-setting results from the type-setting program 11. Its procedure is to issue a system call of socket, bind, listener and accept in the Unix system, for example, as previously described. After establishment of the communication path from the type-setting program, the display screen is initialized at step S92. In this example, the number of pages to be displayed on the window at a time can be specified at the start of the display program. For example, for simplicity, assume that the number of divisions is n, the number of steps is 2, and the vertical and horizontal effective dot sizes on the display screen are v and h, the effective vertical and horizontal dot numbers of actual one page, i.e., V dot and H dot, are $$V\ dot = v/2$$

$$H\ dot = h/((n+1)/2)$$

From the above values and the ratio of the vertical to horizontal dot sizes of actual print image, the reduction ratio on the actual screen can be obtained. If the reduction ratio is obtained in this way, an initial display screen is first created, then its screen is cleared (step S92), and the polling is performed to obtain data from the type-setting program (step S93). If the type-setting data is input, data is stored into the external storage device 3 or internal memory 2 to prepare for the redisplay (step S94).

Next, at step S95, a determination is made whether or not the program is ready for displaying at present, and if so, the program goes to step S96, where data is displayed on the actual window. Note that steps S95 and S96 are the central portion of this example, and will be described in detail with reference to FIG. 11.

This program has the following variables for the input and display of type-setting data.

(in_ptr) is a pointer for use in storing the type-setting data into the external or internal storage, pointing to a location to be stored next. (cur_ptr) is a pointer to the information section allowing the current preview. (in_page) is a page number to which input type-setting data belongs, and (cur_page) points to the page number being displayed on the window currently.

These variables are cleared at step S101, and the polling is made to the data from the type-setting program (step S102). And if there is any page end instruction in the input data, (in_page) counter is updated to provide the currently input page number (steps S103, S104). Next, proceeding to step S105, if data is input, the data is stored into the external or internal storage, and (in_ptr) is updated by the amount of stored data size.

Next, at step S106, it is checked whether or not there is any input of command through the keyboard 9 or mouse 8 from the user, thereby sequentially processing data stored in the event cue 21. These processings are necessary to read the input command, for example, in such a case that when it is possible to display a plurality of pages on the window, but all pages have been displayed and so a new page can not be displayed, the user erases all the pages being currently displayed and displays the new page, or erases the first displayed page and shifts remaining pages to display the new page.

At step S106, it is judged whether or not there is any command from the user stored in the event cue 21, and if at least one may exist, the oldest event is picked up and the processing in accordance with its event is performed at steps S107 to S110. For example, if a comamnd for clearing all the pages being displayed by the user is entered at step S107, all the images being displayed are cleared at step S108, and then the preparation for displaying a new page is made.

Also, if there is a page shift command at step S108, the oldest displayed page is cleared at step S109, and an empty area for displaying the new page is created by shifting the pages being displayed currently. To efficiently move such display data, the backing store memory 22 corresponding to n pages is held in displaying the n pages concurrently, so as to draw the display image onto the backing store memory 22, instead of directly drawing it onto the window. A bit map is expanded from the backing store memory 22 into a VRAM area 61 in which data is practically displayed as the window. Normally, it is very efficient if the server side manages this backing store memory 22 in the window display section, while the client side issues a command to copy the backing store memory 22 corresponding to each page to the position of the VRAM 61 (x,y) with a width w and a height h.

Also, in this way, there is a merit that when the upper and lower relation between windows may be changed, it is sufficient to redisplay only the image at a portion where the state has been changed, without redrawing.

However, with this method, the backing store memory 22 is further needed other than the VRAM 61 for the window, even though the storage capacity such as a memory can be increased, but it is not a large problem because nowadays the memory can be obtained cheaply.

Also, as an alternative, if a window display end command is entered at step S110, the display program is terminated by closing the screen being displayed currently, as well as the communication path set to the type-setting program.

Next, an algorithm in connection with the actual display will be described. At step S111, it is judged whether or not (cur_page) indicates a page to be displayed by the user and the page can be displayed at present, and if not, all the images are cleared, or an alarm is displayed on the window to prompt the user to shift the display page.

On the other hand, if it is in the display enabled state, the program goes to step S113, where the type-setting results are displayed on the window (its detail algorithm will be described later). And if the currently displayed page is completed at step S114, the program goes to step S115, where the variable of (cur_page) is added, to thereby enter into the polling state for reading the next data.

While the outline of display algorithm on the window has already been described with reference to FIG. 9, the details of character drawing function which were not described previously will be described with reference to FIG. 12.

First, at step S120, the ratio of the size of one page displayed on the window screen to the original type-setting size is calculated. And using this ratio, the real font size (real_size) displayed on the screen is calculated from the font image size (orig_size) created at a certain resolution (step S121).

(real_size)=(orig_size)*ratio

At steps S122 and S123, the current position on the type set is calculated, and then the display position on a reduced page is calculated. This is a print position in the backing store memory 22. Here, if the character is too small to display as a result of character reduction, the print is made with the box (□) occupying a full area of character size (step S125).

On the other hand, when the character is large enough to be displayed, the processing is different depending on whether the character pattern is held by the client or server on the window display section 6 (step S126). That is, if it exists on the server side, the program goes to step S129, where the server is searched for optimum font, which font is loaded into the server as a current designated font (step S130), and thus the preparation for character display is completed. And finally, the current position and designated character code are sent to the server (step S131), and the character is displayed on the window.

On the other hand, if the font exists on the client side, the original font is reduced according to the reduction ratio (step S127), an obtained bit map is sent out to the server side in the same protocol as for the image, and the character is displayed (step S128).

After the character has been drawn, a determination is made whether or not the print character is associated with the movement of character width, to thereby determine the next print position (step S132). If it is associated with the movement of width, the width information is extracted from the font metric data 32, and added to the current position to obtain the next print position (step S134).

[Another example]

A basic algorithm in another example of the present invention is shown in FIGS. 13A and 13B.

Figure 10B:
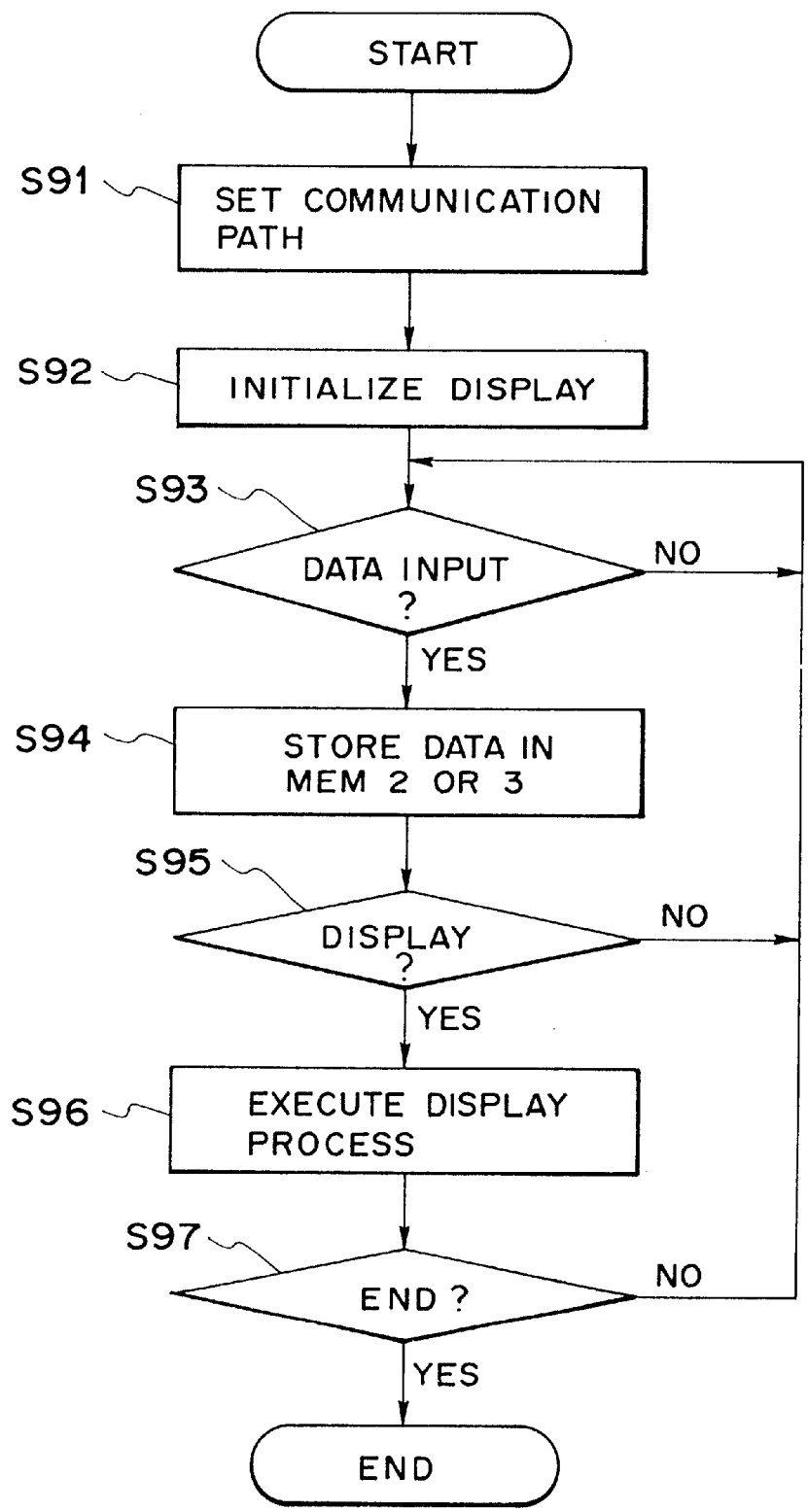

This algorithm is basically the same as in the previous example as shown in FIG. 10. That is, steps S141 to S151 of FIG. 13A are basically the same as steps S71 to S80 of FIG. 10A, while steps S161 to S166 are the same as steps S91 to S97 of FIG. 10B. However, while in the previous flowchart, the type-setting result data were directly passed to the display program, the type-setting results are stored into another file for each page at step S148, and the file name is only sent to the display program at step S149, in this example. Thereby, a corresponding file is opened on the display program side for the display.

Here, if the file name for each page is specified as aaa.bbb, for example, where aaa is a process number for use with OS of Unix, given to the type-setting program, and bbb is a page number within the type set, it is possible to provide a unique file name.

Since there are a plurality of type-setting page files and one DVI file in one type-setting process, in this example, a plurality of type-setting page files are erased at the time when the display program has been completed (step S167).

While in this example, as means for communicating data between the type-setting program and the display program, the interprocess communication was exemplified, but the same features can be achieved with the shared memory between programs.

As above described, according to the present invention, the processed results can be displayed in parallel with the type-setting process, as opposed to the conventional batch processing document systems, thereby allowing the detection of type-setting error in a shorter time, whereby it is possible to provide a document processing system of excellent operativity and efficiency.

Furthermore, as it is possible to set any number of page screens which can be displayed on the window, the operativity can be improved. Furthermore, the confirmation of type-setting features can be allowed more simply than the slip proof by dumping and printing the image displayed on the screen.

As above described, according to the present invention, there is provided an effect that the type-setting results can be rapidly displayed owing to the ability of data communication between the type-setting and display processings.

What is claimed is:

1. A document processing apparatus having a server-client type window system, said apparatus comprising:

ratio calculation means for calculating a ratio of a size of an original document to a size of a window to display the document;

size calculation means for calculating a character size in the document to be displayed in the window according to a character size in the original document and according to the ration calculated by said ratio calculation means;

determination means for determining whether a character font for the character size calculated by said size calculation means exists in a client; and control means, if said determination means determines that the character font exists in the client, for size-changing the character font and sending bit map data obtained from the size-changed character font to a server to cause the server to display a character in the window based on the bit map data, and if said determination means determines that the character font does not exist in the client, for searching the server for a closest character font, setting the closest font as a designated font and sending a character code for the designated font to the server to cause the server to display a character in the window based on the character code.

2. An apparatus according to claim 1, wherein said ratio calculation means calculates the ratio based on a dot size of the original document to be printed in a first resolution and a dot size of the window to be displayed in a second resolution.

3. An apparatus according to claim 1, wherein the size-changing by said control means includes size reduction.

4. A method carried out in a document processing apparatus having a server-client type window system, comprising:

a ratio calculation step of calculating a ratio of a size of an original document to a size of a window to display the document;

a size calculation step of calculating a character size in the document to be displayed in the window according to a character size in the original document and according to the ratio calculated in said ratio calculation step;

a determination step of determining whether a character font for the character size calculated in said size calculation step exists in a client; and a control step, if it is determined in said determination step that the character font exists in the client, of reducing the character font and sending bit map data obtained from the reduced character font to a server to cause the server to display a character in the window based on the bit map data, and if it is determined in said determination step that the character font does not exist in the client, of searching the server for a closest character font, setting the closest font as a designated font and sending a character code for the designated font to the server to cause the server to display a character in the window based on the character code.

5. A method according to claim 4, wherein said ratio calculation step comprises calculating the ratio based on a dot size of the original document to be printed in a first resolution and a dot size of the window to be displayed in a second resolution.

6. A memory medium having computer-readable program code means embodied therein, said computer-readable program code means controlling a method carried out in a document processing apparatus having a server-client type window system, said method comprising:

a ratio calculation step of calculating a ratio of a size of an original document to a size of a window to display the document;

a size calculation step of calculating a character size in the document to be displayed in the window according to a character size in the original document and according to the ratio calculated in said ratio calculation step;

a determination step of determining whether a character font for the character size calculated in said size calculation step exists in a client; and a control step, if it is determined in said determination step that the character font exists in the client, of reducing the character font and sending bit map data obtained from the reduced character font to a server to cause the server to display a character in the window based on the bit map data, and if it is determined in said determination step that the character font does not exist in the client, of searching the server for a closest character font, setting the closest font as a designated font and sending a character code for the designated font to the server to cause the server to display a character in the window based on the character code.

7. A memory medium according to claim 5, wherein said ratio calculation step comprises calculating the ratio based on a dot size of the original document to be printed in a first resolution and a dot size of the window to be displayed in a second resolution.

8. A program product for controlling a method carried out in a document processing apparatus having a server-client type window system, said method comprising:

a ratio calculation step of calculating a ratio of a size of an original document to a size of a window to display the document;

a size calculation step of calculating a character size in the document to be displayed in the window according to a character size in the original document and according to the ratio calculated in said ratio calculation step;

a determination step of determining whether a character font for the character size calculated in said size calculation step exists in a client; and a control step, if it is determined in said determination step that the character font exists in the client, of reducing the character font and sending bit map data obtained from the reduced character font to a server to cause the server to display a character in the window based on the bit map data, and if it is determined in said determination step that the character font does not exist in the client, of searching the server for a closest character font, setting the closest font as a designated font and sending a character code for the designated font to the server to cause the server to display a character in the window based on the character code.

9. A program product according to claim 8, wherein said ratio calculation step comprises calculating the ratio based on a dot size of the original document to be printed in a first resolution and a dot size of the window to be displayed in a second resolution.

* * * * *

UNITED STATES PATENT AND TRADEMARK OFFICE
CERTIFICATE OF CORRECTION

PATENT NO. : 6,189,020 B1                         Page 1 of 1
DATED      : February 13, 2001
INVENTOR(S) : Haruo Shimizu It is certified that error appears in the above-identified patent and that said Letters Patent is hereby corrected as shown below:

<u>Title page,</u>
Item [57] ABSTRACT:
Line 4 "of" should read -- of a --.

<u>Column 1,</u>
Line 36, "Languages)," should read -- Languages"), --.

<u>Column 3,</u>
Line 22, "Of" should read -- of --.

<u>Column 12,</u>
Line 24, "ration" should read -- ratio --.

<u>Column 14,</u>
Line 1, "claim 5," should read -- claim 6, --.

Signed and Sealed this

Twenty-sixth Day of March, 2002

Attest:

JAMES E. ROGAN
*Attesting Officer*     *Director of the United States Patent and Trademark Office*